June 17, 1958   A. R. FULTZ ET AL   2,838,977
STEREO CONTOUR PROJECTOR
Filed June 30, 1954
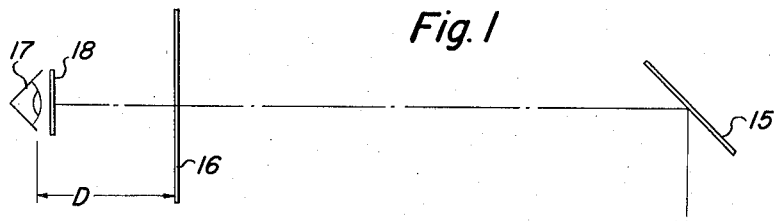
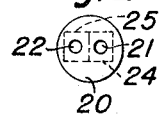
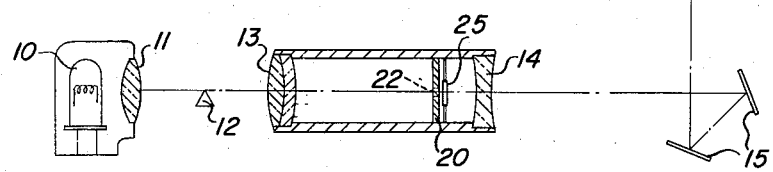
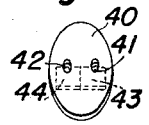
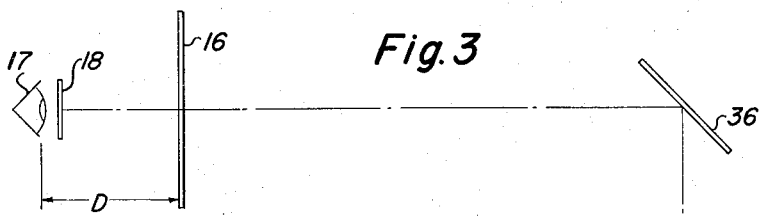
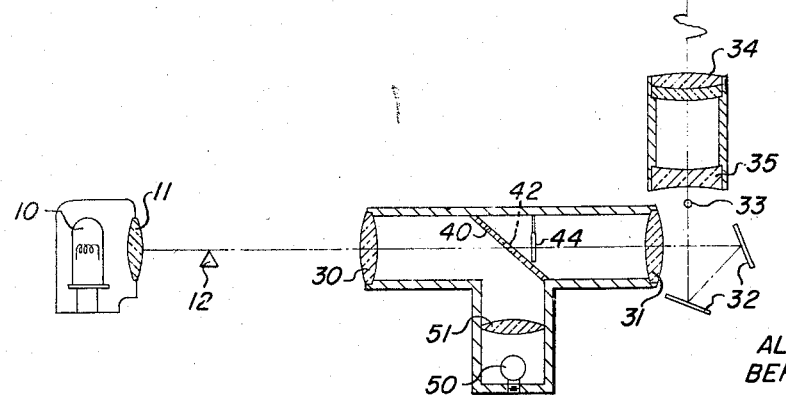
ALLEN R. FULTZ
BERT V. STEVENS
INVENTORS
BY Daniel I. Mayne
   T. M. Emerson Holm
            ATTORNEYS United States Patent Office 2,838,977
Patented June 17, 1958

2,838,977
STEREO CONTOUR PROJECTOR

Allen R. Fultz and Bert V. Stevens, Rochester, N. Y., assignors to Eastman Kodak Company, Rochester, N. Y., a corporation of New Jersey Application June 30, 1954, Serial No. 440,314

5 Claims. (Cl. 88—24)

This invention relates to contour projectors in which an image of a workpiece illuminated diascopically and/or episcopically is projected to a screen for viewing. The invention is directly applicable to tool room projectors of the type described in U. S. Patents 2,552,238 Turner et al.; 2,552,272 Fultz; and 2,552,280 Hudak.

The object of the invention is to provide means for viewing the image stereoscopically. This may seem a little strange when one realizes that such projection systems work at high aperture and the sharply focused part of the image is in general confined more or less to a single plane of the object. The only depth to be seen in the picture thus involves the out-of-focus images in front of or behind the plane which is in sharp focus. In ordinary contour projectors in which the out-of-focus images have a different magnification from those in focus, any stereo appearance has more disadvantages than advantages. Accordingly, the preferred form of the present invention is limited to contour projector systems in which the optical system is telecentric. The feature of any telecentric system is that out-of-focus images have exactly the same magnification as in-focus images. The three patents mentioned above have to do with contour projectors having telescentric optical systems.

The telecentric system of a contour projector may be a simple lens with the effective stop in the focal plane, with or without a field lens at this focal plane or may involve a relay system including one or more telecentric lenses. A preferred form of the invention is applicable to relay systems in which the first relay consists of two positive lenses separated by the sum of their focal lengths with the effective stop of the system in the mutual focal plane so that this relay system is both telecentric and afocal. According to the invention the aperture plate in the rear focal plane of the first positive lens of the optical system contains two horizontally spaced apertures that suitable anaglyph filters either differently colored, or preferably differently polarized, to distinguish the two light beams. The distance between the two apertures is determined by the focal length of the first lens and by the distance at which the screen image is to be viewed. These is, of course, considerable tolerance in this since it does not matter for most purposes whether the view is normal stereo, slightly exaggerated stereo, or slightly diminished stereo. For normal stereo the separation of the apertures divided by the focal length of the first objective should equal normal interocular separation divided by the viewing distance. Normal interocular is about 2½ inches. One rarely views a contour projector screen closer than 10 inches or farther away than 40 inches. Hence, a preferred form of the invention has the apertures separated a distance between 1/16 and 1/4 of the focal length of the objective which receives light from the object under test. A satisfactory value for relatively critical inspection of the screen from a distance of 15 inches requires the aperture spacing to be 1/6 of the focal length of the objective.

The observer wears glasses or other filters over the eyes corresponding to the anaglyph separation. That is, he wears colored filters when colored anaglyphs are produced and wears polarized filters when polarized anaglyphs are used. One feature of this system is the fact that a single lens system focuses the image of one section of the object sharply on the screen so that the two images of this particular section appear in depth to be right at the screen. The out-of-focus parts of the image are the parts which in depth appear to be in front of or behind the screen and nothing in the device can get out of adjustment to change this effect. The sharp part of the image will always appear at the screen. This results in a completely comfortable viewing arrangement since the part under critical study appears to each eye separately to be at the same distance which it appears to be to both eyes stereoscopically. Another factor which contributes to the comfort of the viewer is the fact that the out-of-focus images are at the same magnication as the in-focus ones whereas nontelescentric sytems make near objects appear abnormally large so that the so called "apparent size clue" to depth would be objectionably exaggerated compared to the "stereo or binocular clue." The conscious or unconscious effort involved in resolving this discrepancy in the visual clues presented to the eyes would be objectionable. Any residual discrepancy in the opposite direction when the images are all the same magnification is negligible and, of course, is necessary for maximum precision of measurements.

Preferred embodiments of the invention are described in connection with the accompanying drawings in which:

Fig. 1 illustrates schematically the optical system for a simple form of the invention;

Fig. 2 is a front view of the aperture plate of Fig. 1;

Fig. 3 schematically illustrates a more complex preferred form of the invention; and Fig. 4 shows the aperture plate of Fig. 3.

In Fig. 1 light from a lamp 10 is collimated by a condenser 11 to provide a shadow image of an object 12 being tested. A positive lens 13 together with a negative field lens 14 and a series of three mirrors 15 projects the greatly enlarged shadow image of the object 12 onto a screen 16 to be viewed by the eye 17 of an observer at a distance D from the screen 16. According to the invention the lens 13 is telecentric by having an effective stop formed by apertures in a plate 20 in the rear focal plane of the lens 13. The apertures 21 and 22 in the plate 20 are horizontally spaced; the ratio of the separation of the centers of the apertures to the focal length of the lens 13 corresponds roughly to the ratio of the interocular (i. e., 2½ inches) to the distance D at which the screen 16 is viewed. This value is not too critical and the separation of the centers of the apertures 21 and 22 can be considerably less than the optimum value and still give a useful degree of depth appearance to the image on the screen 16.

Immediately behind the apertures 21 and 22 are polarizing filters 24 and 25 oriented at right angles to each other so that the right and left eye images on the screen 16 are differently polarized. Suitable polarizing filters 18 over the eyes of the observer permit the eyes to distinguish between the stereo images on the screen 16 in the usual way.

The actual images are somewhat different from anaglyphs since the part of the image under study is exactly superimposed in both images since it is focused by exactly the same lens 13 and nothing can disturb this relationship. The present invention relates to the production of the stereo images on the screen 16. Any standard method for viewing such immages may be used, the simplest being to have anaglyph spectacles. The shape of the apertures 21 and 22 is not critical. They may be elongated vertically in order to pass as much light as possible and in practice they can be quite wide, for this same purpose, without interfering appreciably with the stereo effect. They must not quite touch each other and preferably the edges must be separated say 1/50 to 1/4 of the focal length of the objective 13.

In Figs. 3 and 4 in the invention is applied to a relay system in which light from the object 12 is first relayed by positive lenses 30 and 31 separated by the sum of their focal lengths and by mirrors 32 to form an aerial image 33. This image 33 is picked up by an objective consisting of lenses 34 and 35 and with one reflection at a mirror 36 is focused on the screen 16. The advantages of such relay systems are described in the above mentioned patents. According to the present invention the effective stop of the system consists of two horizontally spaced apertures 41 and 42 located in the mutual focal plane of the lenses 30 and 31. The plate 40 containing the apertures 41 and 42 is mounted obliquely in the housing of the afocal relay system and the front surface of the plate 40 is highly reflecting to allow light from a lamp 50 and condenser 51 to be reflected through the lens 30 to illuminate the object 12 episcopically. If the apertures 41 and 42 are elongated in the vertical direction, the top and bottom of such apertures are in planes other than the mutual focal plane of the lenses 30 and 31 which tends to introduce some distortion in the telecentric effect. This is not too serious in practice, but is is preferable to restrict the size of the apertures 41 and 42 as far as is compatible with the amount of light which must be passed by the system. The more intense the lamp 10, the smaller the apertures 41 and 42 may be. In optical alignment with the apertures are anaglyph filters 43 and 44 which, as before, may be differently colored or polarized and differently oriented.

We claim:

1. A stereo optical system for a contour projector comprising means for illuminating an object to be viewed, an image display screen, a telecentric lens system for receiving light from the object and projecting an image thereof on the screen, said telecentric lens system including a first objective for receiving the light from the object and an aperture plate with two horizontally spaced apertures as the telecentric stop of the lens system located in the rear focal plane of said objective and a pair of anaglyph filters respectively over the apertures for distinguishing the two beams passing through the apertures.

2. A system according to claim 1, in which the anaglyph filters are plane polarizing filters oriented at right angles to one another.

3. A system according to claim 1 in which the telecentric lens system includes a first relay lens system for receiving light from the object and for forming a real image thereof and an objective for receiving light from this image and projecting it into focus on the screen, the first relay lens system being an afocal telecentric one consisting of two positive lenses separated by the sum of their focal lengths with the aperture plate located substantially in the common focal plane of the two positive lenses.

4. A system according to claim 1 in which said apertures are separated a distance between 1/16 and 1/4 of the focal length of said objective.

5. A system according to claim 1 in which said apertures are separated a distance about equal to 1/6 of the focal length of said objective.

References Cited in the file of this patent

UNITED STATES PATENTS

| | | |
|---|---|---|
| 725,567 | Ives | Apr. 14, 1903 |
| 1,372,645 | Cooper | Mar. 22, 1921 |
| 1,605,016 | Tresize | Nov. 2, 1926 |
| 2,329,294 | Ramsdell | Sept. 14, 1943 |
| 2,552,238 | Turner | May 8, 1951 |
| 2,552,280 | Hudak | May 8, 1951 |
| 2,639,653 | Fischer | May 26, 1953 |